(12) United States Patent
Krueger

(10) Patent No.: US 7,216,233 B1
(45) Date of Patent: May 8, 2007

(54) APPARATUS, METHODS, AND COMPUTER PROGRAM PRODUCTS FOR FILTERING INFORMATION

(75) Inventor: Jonathan P. Krueger, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 580 days.

(21) Appl. No.: 09/639,385

(22) Filed: Aug. 14, 2000

(51) Int. Cl.
*H04L 9/00* (2006.01)
(52) U.S. Cl. ............... 713/176; 713/166; 713/168
(58) Field of Classification Search ........ 713/150, 713/160, 166–167, 168–170, 176, 181, 200–201, 713/188; 709/217; 726/22–24, 26–30
See application file for complete search history.

(56) References Cited

U.S. PATENT DOCUMENTS

| | | | | |
|---|---|---|---|---|
| 5,673,318 A | * | 9/1997 | Bellare et al. | 713/170 |
| 5,680,452 A | * | 10/1997 | Shanton | 713/167 |
| 5,867,646 A | * | 2/1999 | Benson et al. | 713/200 |
| 5,889,943 A | * | 3/1999 | Ji et al. | 713/201 |
| 5,926,624 A | * | 7/1999 | Katz et al. | 709/217 |
| 5,956,481 A | * | 9/1999 | Walsh et al. | 726/23 |
| 6,453,327 B1 | * | 9/2002 | Nielsen | 715/500 |

* cited by examiner

Primary Examiner—Hosuk Song
(74) Attorney, Agent, or Firm—Martine Penilla & Gencarella, LLP

(57) ABSTRACT

A digital signature is embedded in the header of selected content to be transmitted. A recipient of the content identifies the priority of the content according to header line content or signature presence and segregates signed priority content from non-authenticated content. Signature generation and filtering as well as certification are accomplished by running application specific software on a selected computer. Required e-mail access level may vary with the intended recipient and/or with the instrumentality by which e-mail access is allowed.

18 Claims, 10 Drawing Sheets

CONTENT ITEM
*150*

DIGITAL SIGNATURE
*151*

CONTENT
*152*

FILTERING AGENT FOR AUTOREGISTRATION OF SIGNATURE AUTHORIZED USERS
*153*

REGISTER OF SECOND USERS HAVING SIGNATURE ACCESS
*154*

FIG. 1C

APPARATUS, METHODS, AND COMPUTER PROGRAM PRODUCTS FOR FILTERING INFORMATION

COPYRIGHTS IN PATENT MATERIALS

Portions of this patent document contain material subject to copyright restriction. The copyright owner has no objection to facsimile reproduction of the patent document after grant, as it appears in the U.S. Patent and Trademark Offices files or records, but otherwise reserves all rights relating thereto.

TECHNICAL FIELD

The field of this application relates to apparatus, methods, and computer program products for prioritizing content and information according to transmitter origin and particularly to apparatus, methods, and computer program products for filtering content and information, such as electronic mail.

BACKGROUND OF THE INVENTION

Unsolicited and undesired electronic mail (i.e., e-mail), particularly commercial e-mail originating remotely from an organization or network removed from the receiver has been referred to as "spam." Spam is a problem because it clogs e-mail channels and communication systems with undesired content. E-mail has become a primary business communication too, but has also become a transmission method for viruses. However, increasing amounts of spam are foisted upon business communicators, preventing and interfering with legitimate content distribution. Distinguishing undesired e-mail from desired e-mail is difficult because articulation of an objective standard for the subjective notion of what is desirable and what is not desirable is complex and not easy to automate in software or electronics. A technical solution to choosing or discriminating between various items of content is thus a daunting challenge.

It is accordingly desirable to enable user and entity discrimination between local and remotely originating e-mail. It is further desirable to discriminate between e-mail originating within a selected organization or entity and e-mail originating externally to that organization or entity. It is desirable to be able to authenticate e-mail and to discriminate between internally and externally generated e-mails. It is known currently to cancel forged messages to moderated USENET groups as per PGP Moose, as discussed in detail below in connection with FIGS. 3–5.

SUMMARY OF THE INVENTION

According to the present invention, a digital signature specific to an individual or entity is associated with selected content or information for transmission with the content to one or more recipients. According to the present invention, an entity or individual signs its own content or e-mail and checks for the presence of signatures to prioritize incoming messages, content, or e-mail. Content lacking a valid signature is identified as not having been transmitted from within the selected organization or entity. According to the present invention, a transmitting mailer signs outgoing content with a selected private key or other identification (ID) prior to transmission of the particular content. The receiver of information or content checks for a valid signature or other transmitter identifying signal upon receiving particular content. E-mail or other content that does not originate locally (within a designated entity) is still able to be received and read, but it is handled differently than locally transmitted content. For example, locally originating content is according to one embodiment of the present invention placed in a different incoming e-mail folder or is positioned at the end of a predetermined message list. This preferential treatment or prioritization of content, according to the present invention, prevents non-authorized content of which spam is a well-recognized type from clogging local entity e-mail intended primarily for communication of particular content from local entity people to other local entity people.

The signing mechanism according to one embodiment of the present invention uses a selected digital signature method such as cryptographically strong hashes, for example MD5. Thus, a sender within a particular entity or organization will sign a message or other content with a private key associated with the entity. The signature and the content are then transmitted in a common package according to one embodiment of the present invention. Thus, a message is transmitted with the private key of a selected organization. According to one embodiment of the present invention, the signature is certified by an internal certification authority by providing the entity public and private keys to entity members in encrypted form. Mail readers and content recipients are thereby able to distinguish internal e-mail from external mail (i.e., "intramural" from "extramural" e-mail) by detecting the presence or absence of an appropriate signature in transmitted content which has been received. This approach does not rely upon an e-mail header or an IP address for such distinction, because e-mail headers and IP addresses can be "forged."

According to the present invention, different kinds of content (i.e., legitimately signed and unsigned content) are handled differently upon reception. Non-authorized material of which spam is a well recognized example is filtered intelligently into remote storage according to one embodiment of the present invention and accordingly doesn't clog communication channels within an organization which otherwise might pass through all e-mail indiscriminately without filtering out extramural e-mail. According to one embodiment of the present invention, unsigned e-mail and other received content is directed into a different folder or at the end of a message list or otherwise, separating it from know valid intramural e-mail.

BRIEF DESCRIPTION OF THE DRAWINGS

FIG. 1C is a block diagram of a content item to be transmitted including a digital signature according to the present invention.

DETAILED DESCRIPTION OF A PREFERRED MODE

Figure 1A:
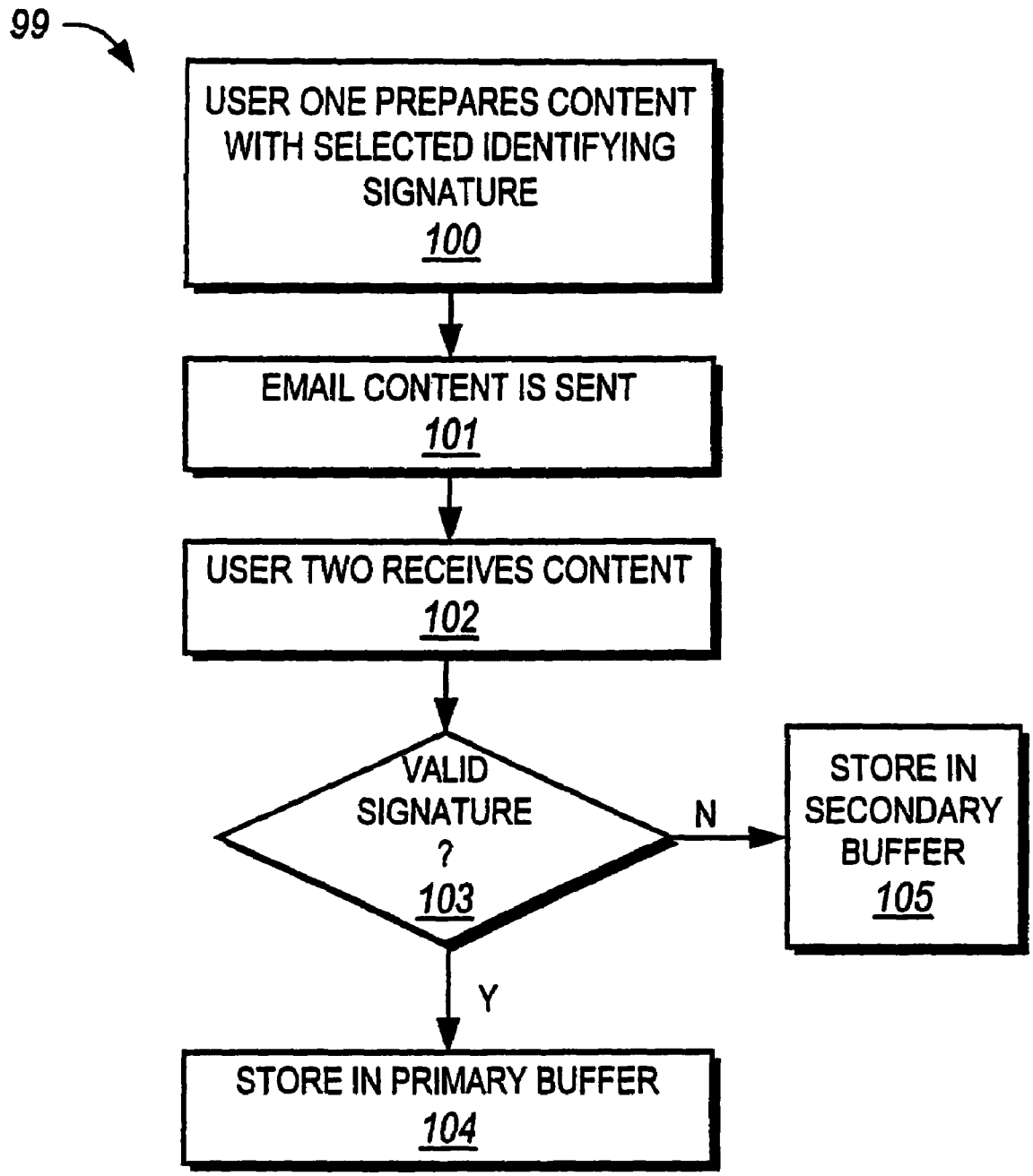
FIG. 1A is a flow chart of an e-mail filtering method according to the present invention.

FIG. 1A is a flow chart of an e-mail and content filtering method 99 according to the present invention. In particular, according to the present invention, a first user (i.e., "user one") prepares 100 selected content (e.g., without limitation, an e-mail message) for transmission to users or recipients within or without a selected entity or organization. According to one embodiment of the present invention, a pool or group of potential recipients or candidate recipients is pre-established and identified by membership (or employment) within a particular organization or entity. The members have received the public and private encryption keys of the entity as well as the public key of a trusted certification authority within the entity. The content to be transmitted is processed with a predetermined encryption algorithm and the entity private key to generate an identifying signature which according to one embodiment of the present invention is embedded or otherwise integrated or associated with the content being transmitted. According to one embodiment of the present invention, the signature is secured in the header line of an e-mail message to be transmitted. According to another embodiment of the present invention, the one or more selected signatures are embedded or distributed within one or more regions of the selected content to be transmitted. According to yet another embodiment of the present invention, a digital signature is integrated with selected portions of the content to be transmitted according to a predetermined algorithm. After a particular item of selected content has been provided or integrated with a particular signature or signatures, the content item is transmitted, broadcast, or distributed 101 to addressable and non-addressable nodes, switches, bridges, routers and networks (local, wide, metropolitan, or Internet, without limitation). After transmission, a second user (i.e., "user two") detects, reads, or receives 102 all or a portion of the transmitted content and the associated signature, and initiates content filtering operations according to the present invention. Such filtering operation according to one embodiment of the present invention includes determining 103 whether the received content portion includes a signature at all and then whether the signature is a valid one. According to the present invention, the signature is valid if it can be decrypted to produce information which is coincident with a predetermined authentication reference. If a signature is present and valid, then the content portion or the entire message is stored 104 in a primary buffer or memory location or region which has priority and is thus readably available to the receiving user. The priority criterion may include such factors as convenience, accessibility, order in a listing, or proximity for data accessing, by way of an example without limitation. If a signature is found not to be valid as to the present entity after an assessment has been conducted, then the affected content portion associated with the invalid signature is stored or retained 105 in a secondary buffer or memory location or region having lower priority and which is not immediately available or accessible to the receiving user. For example, the members of the secondary buffer may be arranged numerically to follow in order after the members of a primary buffer of a listing of a preestablished e-mail mailbox.

Figure 1B:
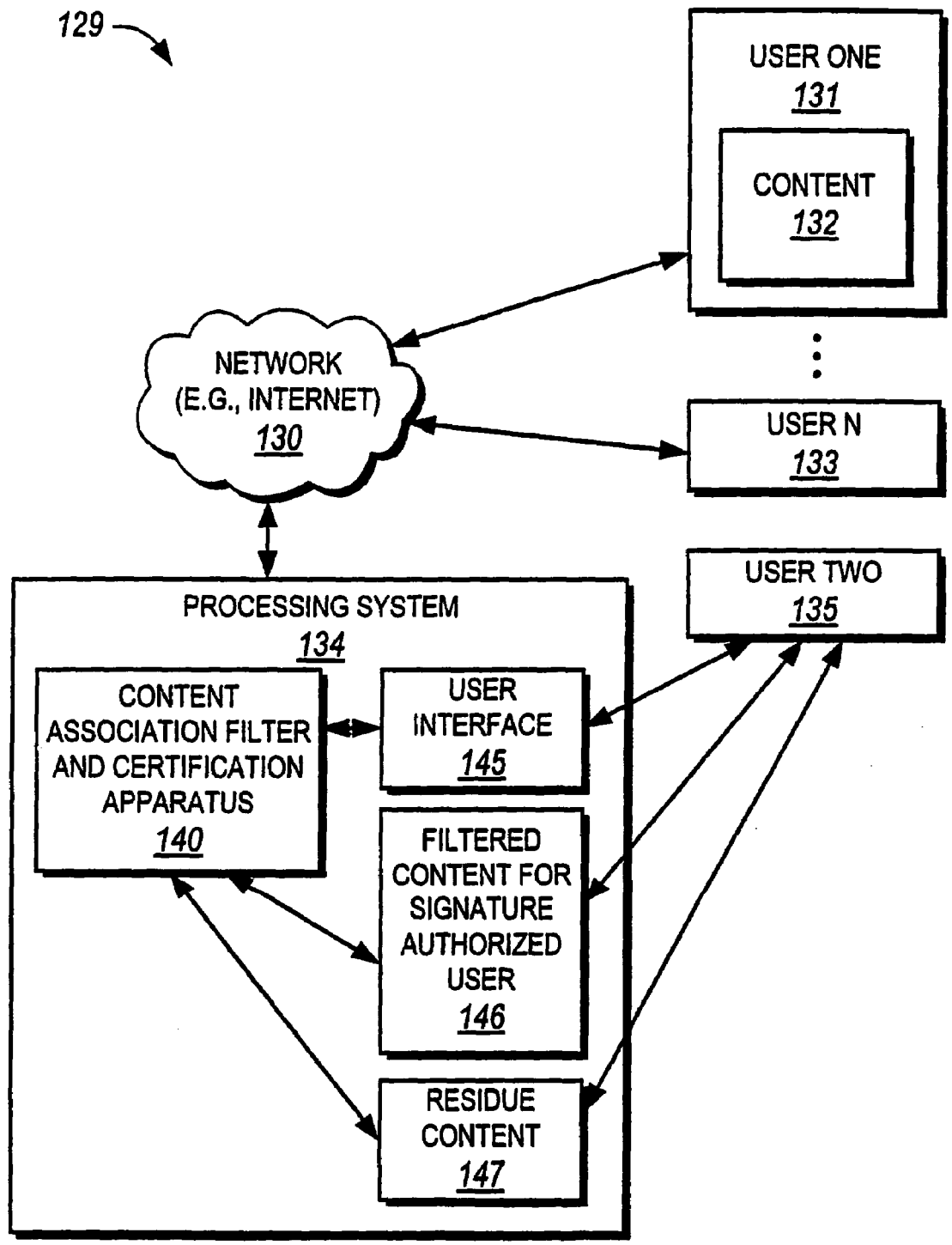
FIG. 1B is a block diagram of a computer network including a computer processing system for content filtering according to the present invention.

FIG. 1B is a block diagram of a computer network including a processing system which can be used with content filtering according to the present invention. In particular, computer network 129, according to one embodiment of the present invention, includes a network 130 (e.g., the Internet) and a first user node 131 (e.g., user one) at which the first user develops or stores selected content 132 for distribution with one or more embedded or integrated signatures according to the present invention. Computer network 129 further includes an "nth" user node 133 to which content may be transmitted and from which content may be received. Computer network 129 further includes a computer processing system 134 in turn having a content association filter and certification apparatus (CAFCA) 140 according to the present invention, a user interface 145 connected to the CAFCA 140, a buffer 146 for holding or retaining filtered content, and a buffer 147 for holding or retaining residue content which either did not contain any signature or did not contain a valid signature. Computer network 129 further includes a second user node (e.g., user two) 135. User two 135, according to one embodiment of the present invention, is connected to CAFCA 140 through user interface 145 in order to access or read content in buffer one 146 and/or buffer two 147. According to one embodiment of the present invention, user two 135 has direct memory addressing (DMA) access to buffers 146 and 147. According to one embodiment of the present invention, buffers 146 and 147 are combined in a single memory and the contents of buffer 147 are arranged to follow the contents of buffer 146 in order of accessibility.

FIG. 1C is a block diagram of a content item 150 according to the present invention. In particular, content item 150 includes a digital signature 151, selected content 152, a filtering agent 153 for auto registration of signature authorized users, and a register 154 of users having signature access to particular content. According to the present invention, when a content item 150 is received by a second user or a processor associated with a second user, filtering agent 153 which contains a computer program product to enable installation and self configuration of a content association filter apparatus effective for identifying second users entitled to signature access to particular content is activated.

The register 154C in FIG. 1C receives an information item (document, memorandum data, etc.) and examines an access level indicator 155 associated with the item. The access level indicator 155 identifies or refers to the associated information item and sets forth an access level signature that must be presented in order for a user to obtain access to that item. The spectrum of access levels may be a linear arrangement in which, for a any two distinct access levels, one of the two access levels (level 1) is always "greater than" the other access level (level 2); the levels 1 and 2 are said to be comparable and are illustrated in FIG. 1F. Alternatively, the spectrum of access levels may have parallel branches in which two distinct access levels can be found for which neither level can be said to be "greater than" the other level; the two access levels are not comparable, because neither level can be compared to the other level in a linear format of access levels, as illustrated in FIG. 1G.

When an e-mail system grants access to a specified e-mail message (e.g., for display, presentation to a user, incorporation into a folder, electronic downloading, provision of a hard copy, automatic display or execution of an attached document, etc.), the e-mail system also checks the e-mail message access level indicator. The system either authenticates the asserted access level or rejects the asserted access level. If the access level is authenticated, the system identifies the access level and checks this level against an access level that is required for processing the message (for display, etc.).

At least three situations are possible: the system confirms that the access level presented is at least as high as the required access level; (2) the system confirms that the access level presented is not as high as the required access level and denies access and/or logs the event; and (3) the system determines that the presented access level and the required access level are not comparable (e.g., the situation is as illustrated in FIG. 1G), notifies the user and/or a competent authority of this situation and does not, at that time, permit the access. If a competent authority subsequently examines the situation and determines that access should be granted by the system, the competent authority transmits an authorization, which is preferably authenticated by the system, to grant or perform the access.

Access levels may include any or all of the following restrictions on access instrumentality, or method of receiving the message: (1) display only; (2) electronic downloading; (3) provision of a hard copy; (4) automatic display of attached document(s); and (5) automatic execution of attached file(s). Optionally, one or more of these access instrumentality levels requires presentation and authentication of an asserted access instrumentality level that must be at least as high as the access instrumentality level proposed to be used to present the message to the intended recipient.

It is possible to configure or define the access levels across an organization, based on the behavior of the particular e-mail system that performs or denies access, and/or based on requirements for individual users. An individual user can vary his/her access level requirements, increasing or decreasing the required access level depending upon the circumstances. For example, an individual could deny level 5 access for his/her own e-mail, in order to minimize the likelihood of successful execution of a computer virus associated with an e-mail message. This configuration provides flexibility in establishing, securing and controlling an organization's e-mail.

The sequence (or a selected subsequence) of restrictions on instrumentality for access may be imposed by the system based on a comparison of the user access level, the required information item access level and other relevant information, and is preferably imposed after the system determines that the user is entitled to have access to the requested information item.

Figure 1D:
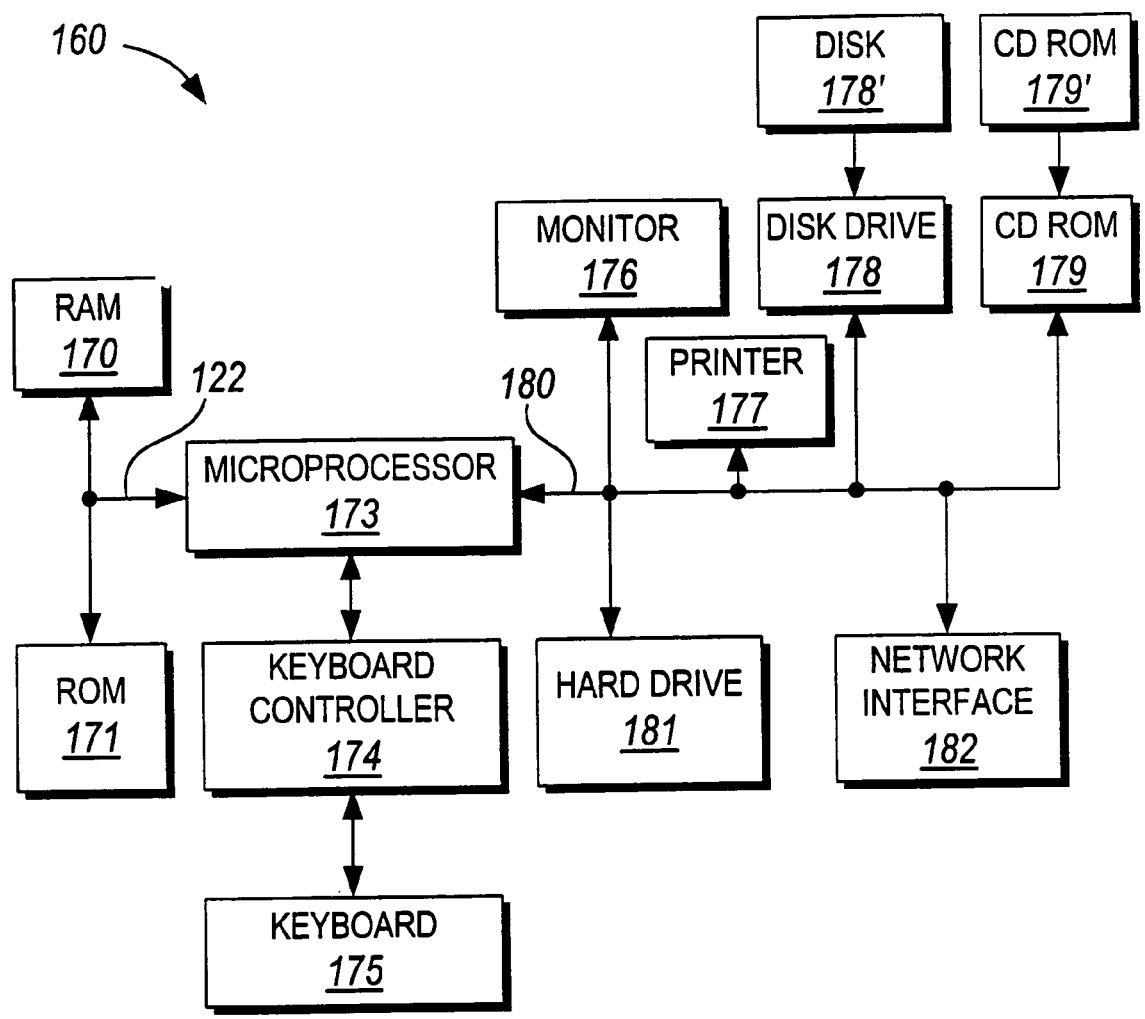
FIG. 1D is a block diagram of a computer system which can be used as a processing system for filtering content in accordance with the present invention.

FIG. 1D is a block diagram of a computer system 160 which can be used as a computer processing system for filtering content and certifying signatures in accordance with the present invention. Computer system 160 particularly includes a random access memory (RAM) 170; a read only memory (ROM) 171; a memory bus 172 connected to RAM 170 and ROM 171; a microprocessor 173 connected to the memory bus 172; a monitor 176; a printer 177; a disk drive 178; a compact disk read only memory (CD ROM) drive 179; a peripheral bus 180 connected to monitor 176, printer 177, disk drive 178, and CD ROM drive 179; a hard drive 181; and a network interface, each connected to peripheral bus 180 as shown in FIG. 1D. Disk drive 178 and CD ROM drive 179 are respectively able to read information including computer program products (not shown) which can be embedded on media such as, respectively, a magnetic or optical disk or floppy 178' and a CD ROM medium 179'. Depending upon the selected drive and medium, writing on the selected medium as well as reading can be accomplished.

Figure 1E:
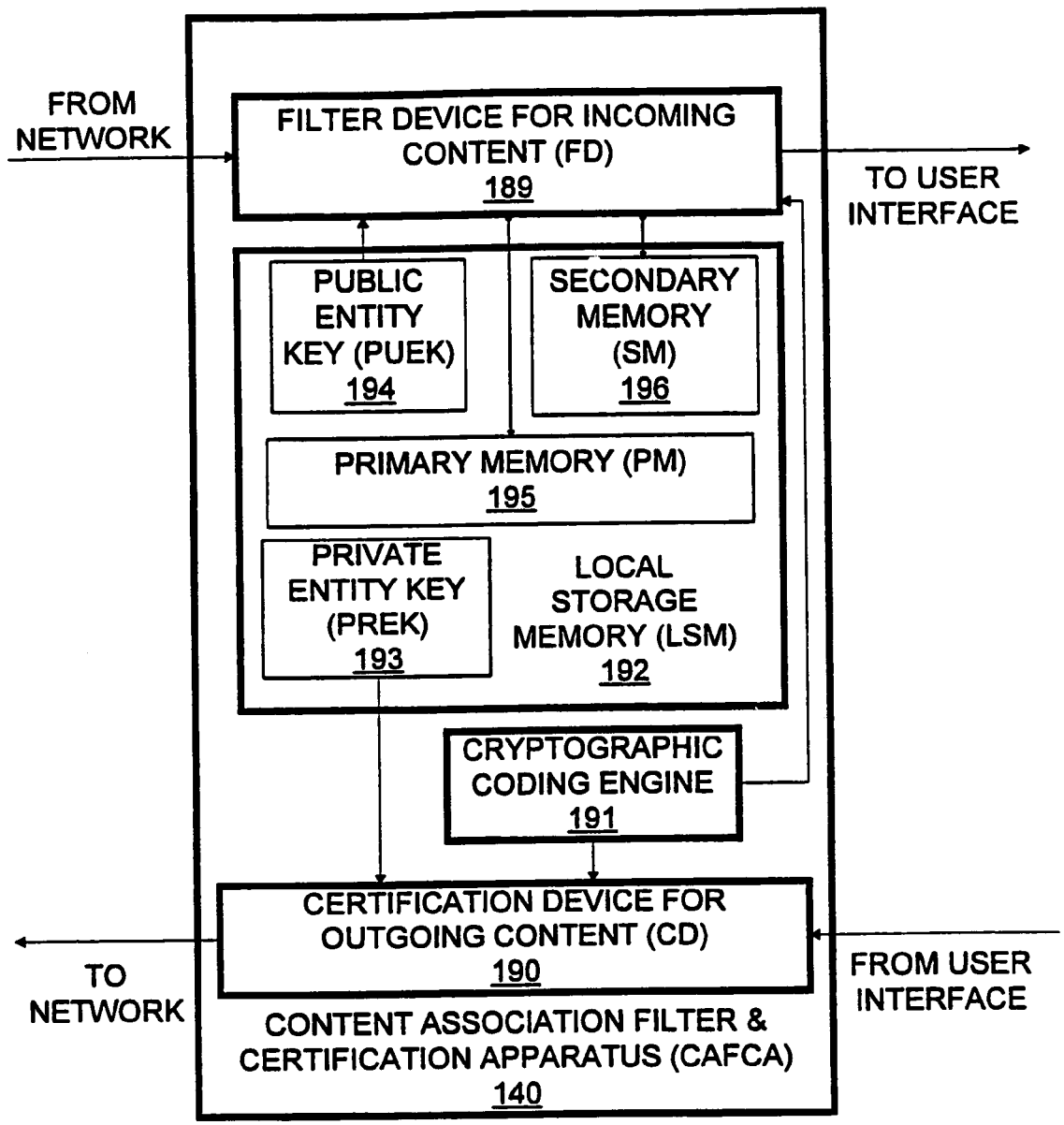
FIG. 1E is a block diagram of a content association filter and certification apparatus (CAFCA) according to one embodiment of the present invention.
Figure 1F:
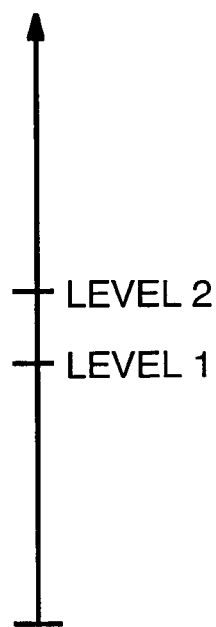
FIGS. 1F and 1G illustrate linear and branched access level requirements that are accounted for by the invention.
Figure 1G:
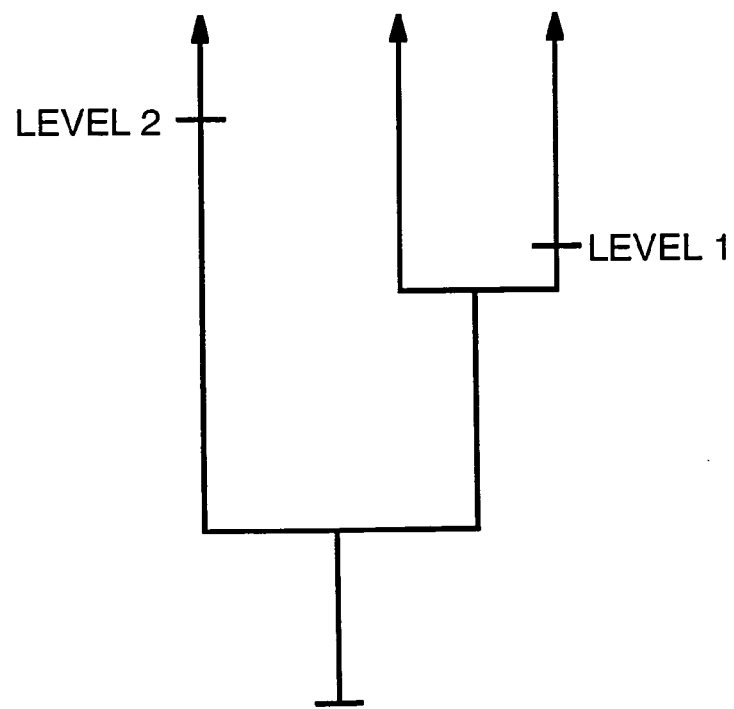

FIG. 1E is a block diagram of a content association filter and certification apparatus (CAFCA) 140 according to one embodiment of the present invention. In particular, CAFCA 140 according to one embodiment includes a filter device (FD) 189 for filtering incoming content to determine its status as authorized or unauthorized for example, a certification device (CD) 190 for certifying outgoing content by applying a signature based upon a private key and an encryption algorithm as discussed below, a cryptographic coding engine (CCE) 191 connected to FD 189 and CD 190, and a local storage memory (LSM). The CCE 191 contains and provides a predetermined algorithm (such as DSA) for signature decryption by FD 189 and for signature creation by CD 190, invention, a CAFCA 140 can have either an incoming content filter device 190 or an outgoing content certification device 191 or both. Incoming content filter device 190 filters content received from another user within the same or another network, according to the present invention by checking for the presence or absence of a header or signature. If a header is present identifying an acceptable source, the authenticated content is retained or stored preferentially. Alternatively, if a signature is detected identifying (after decryption) an acceptable source, then again the content is considered acceptable for segregation or other preferential treatment. Outgoing content certification device 191 provides a signature, according to the present invention, to outgoing content to enable recipient users in the same or another network to conduct a filter operation, according to the present invention, to determine whether the content received is legitimate, high priority content and not non-authorized spam which can be discarded or set in a lower priority buffer or memory region. More particularly, content certification device 191 according to one embodiment of the present invention is configured to receive and store a private key of an individual or entity. According to one embodiment of the present invention, a digital signature is a group of bits which can be analyzed to produce a validating result authenticating a purported source individual or entity providing the signature as an identifying mark. The digital signature is self-authenticating and it further validates any content associated with the signature as content of the individual or entity performing the signing act. A digital signature is created according to one embodiment of the present invention by encrypting selected content wholly or partially with which the signature is to be linked, by using an entity or individual private key according to a selected encryption algorithm. According to one embodiment of the present invention, a signature is generated by CD 191 according to the Digital Signature Algorithm (DSA) proposed by the U.S. National Institute of Standards and Technology on 30 Aug. 1991 in the Federal Register, pp. 42980–42082. A DSA signature according to one embodiment includes a pair of large numbers represented in a computer by strings of binary digits. The digital signature according to this embodiment is compiled with a series of computational rules according to the DSA algorithm and a set of parameters to make it possible to certify both the identity of the signatory person or entity and the integrity of the data as verifiably free of tampering. The DSA algorithm thus makes it possible to generate and verify signatures. In particular according to the DSA algorithm, a digital signature is generated by using the DSA and a selected private key of an individual or entity to encrypt selected content. An e-mail message is the combination of the signature and the unencrypted content, where the signature itself is an embodiment of an encrypted form of the content. Accordingly, tampering of the content can be detected by comparing the decrypted content within the signature (which is a regeneration of the original content) with the received unencrypted content transmitted in connection with the signature. Encryption is accomplished according to the present invention by applying the DSA algorithm (for example) with a particular private entity or individual key, such as PREK 193 example. Decryption of the signature is accomplished by applying the public key (i.e., PUEK 194) available to the entity recipient of the message or e-mail according to one embodiment of the present invention. The parameters of the DSA algorithm used according to the present invention include (1) a prime number p such that $2^{L-1}>p>2^2$ for $512 \leq L \leq 1024$ and L=64*(alpha) for any alpha; (2) a prime number q such that $2^{159}<q<2^{160}$ and p−1 is a multiple of q; (3) a number g of order q*modulo(p) such that $g=h^{[(p-1)/q]}*(modulo (p))$, where h is any integer such that 1<h<p−1 and $g=h^{[(p-1)/q]}$ (*modulo (p))>1; (4) a private key which is a number x generated psuedorandomly or randomly; (5) a public key which is a number y such that $y=g^x*(modulo (p))$; and (6) a number k generated psuedorandomly or randomly such that o<k<q. The integers p, q, and g are parameters which are shared by communicating users employing the DSA algorithm, according to one embodiment of the present invention. The private and public keys are x and y respectively used for coding and decoding. The parameters x and k are used to generate signatures for use in accordance with the present invention, and the parameter k is regenerated for each signature. A user who wishes to engage in encryption for constructing a digital signature which will be transmitted with selected content creates a signature according to one embodiment of the present invention by computing $r=(g^k*modulo (p))*modulo (q)$ and $s=[(m+xr)/k]* modulo (q)$ where k is modulo (q). The signature is thereupon verified by computing $w=[1/s]*modulo (q)$; $u_1=mw*(modulo(q))$; $u_2=rw*modulo (q)$; $v=(g^{u_1}y^{u_2} modulo(p))*modulo (q)$; and comparing v and r for equality to determine whether the signature is or is not authentic. Accordingly, the PREK 193 is used to create a signature of the individual or entity with the DSA algorithm according to one embodiment of the present invention. The signature is created for example by encrypting the entire content or information to be transmitted with the DSA algorithm using the PREK 193. Alternatively, selected or randomly determined portions of the content are encrypted with the DSA or another cryptographically strong algorithm to generate the signature. The signature is then transmitted with the unencrypted version of the content. When the signature is decrypted, another version of all or part of the content is available for tamper comparison with the received unencrypted content. In particular, selected bits or all of the decrypted content is compared with the unencrypted content. If there are differences, tampering or other errors are presumed to have occurred, causing the information recipient to be on guard and to undertake separate content authentication or assurance procedures.

Content certification device 190 may additionally receive and store the public key of a certification authority from which entity public and private keys may be received on a one time basis or on multiple occasions. With this public key, messages and new entity and private keys can be securely received from the certification authority of a particular entity. Filter device 190 according to one embodiment of the present invention filters received information and content by receiving and classifying information received, by determining whether the information includes an indication of local origin, and by assigning priority to any local origin received information. The information received according to one embodiment of the present invention includes selected subject matter and header content. The header content according to one embodiment of the present invention is a header line. According to one embodiment of the present invention, the filter device 190 discriminates and classifies information based upon origin information identified in the header or in any other portion of the information received. Alternatively, local origin is determined by decrypting a sender signature to produce secure content for comparison with the content subject matter provided with the signature. Alternatively, local origin is determined by the presence of the senders authenticable private key which has been encrypted into the signature.

Figure 2:
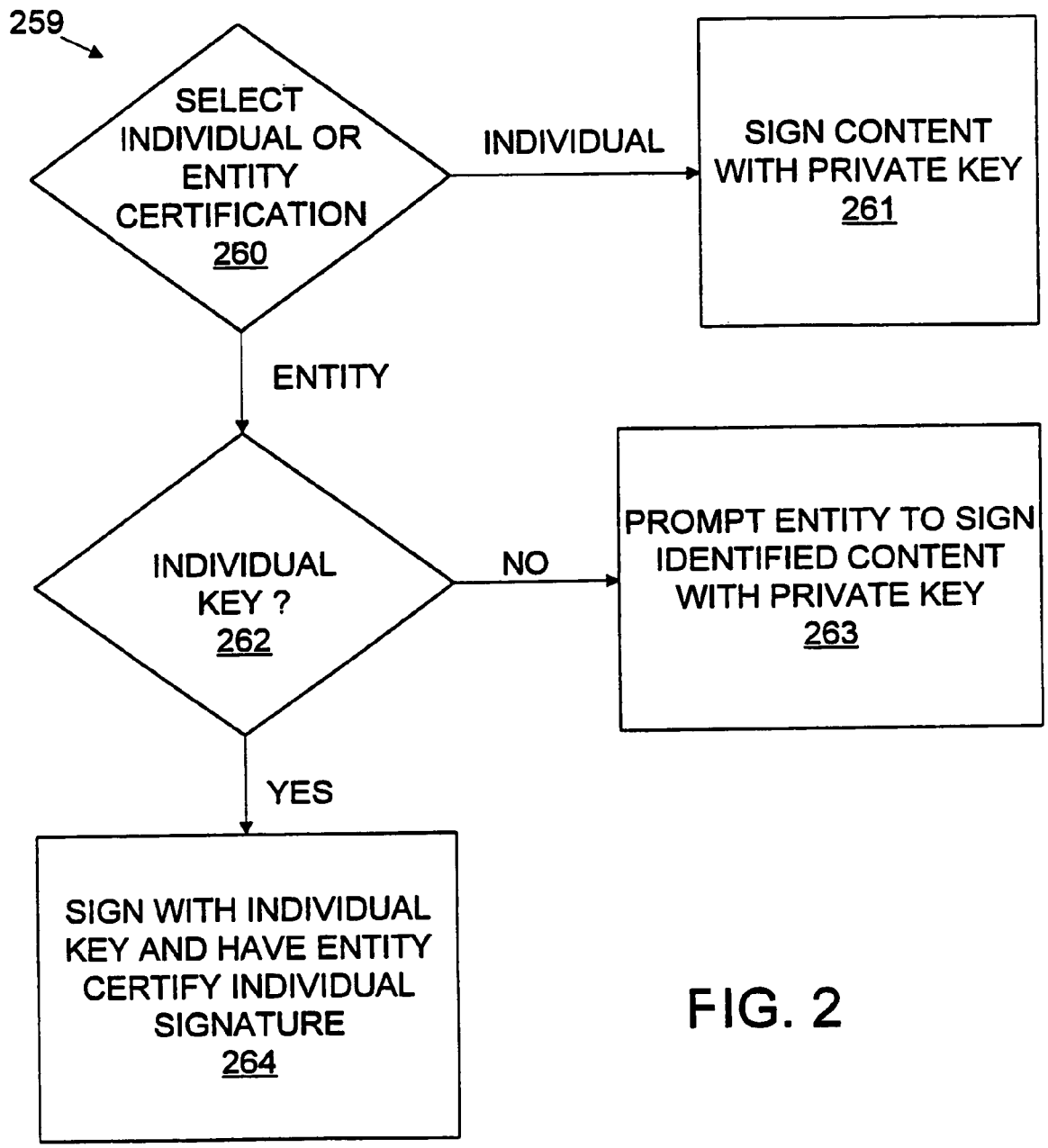
FIG. 2 is a flow chart of a signature authorization method according to the present invention.

FIG. 2 is a flow chart of a signature authorization method 259 according to the present invention. According to one embodiment of the present invention, method 259 includes determining whether to select 260 individual or entity certification of a particular item of content to be transmitted. Individual certification provides the selected item of content with an individual imprimatur or signature identifying the selected content as being identified with a particular individual. Entity or group certification provides the content with a signature associating the selected content with the particular group or entity. If individual certification is to be accomplished, then the particular content item is provided 261 with the signature of the certifying individual. The signing action can, according to one embodiment of the present invention, entail executing, embedding, or integrating a signature on or in the content with the private key of the individual or entity, for example. Next, a determination is made 262, according to the present invention, whether the entity certification is to be accomplished with an individual key or with a group or entity certification. If an individual signature is needed, then the entity with which the individual is associated certifies 264 the individual signature according to one embodiment of the present invention. If no individual signature or key is desired, the entity itself or a representative of the entity accomplishes 263 signature on behalf of the particular entity. According to one embodiment of the present invention, the entity certifies private and public keys of the entity by providing each private key of the entity to the members of the entity in encrypted form, using a second entity private key having a public counterpart already known to the members to enable decryption of the new entity public and private keys.

Figure 3:
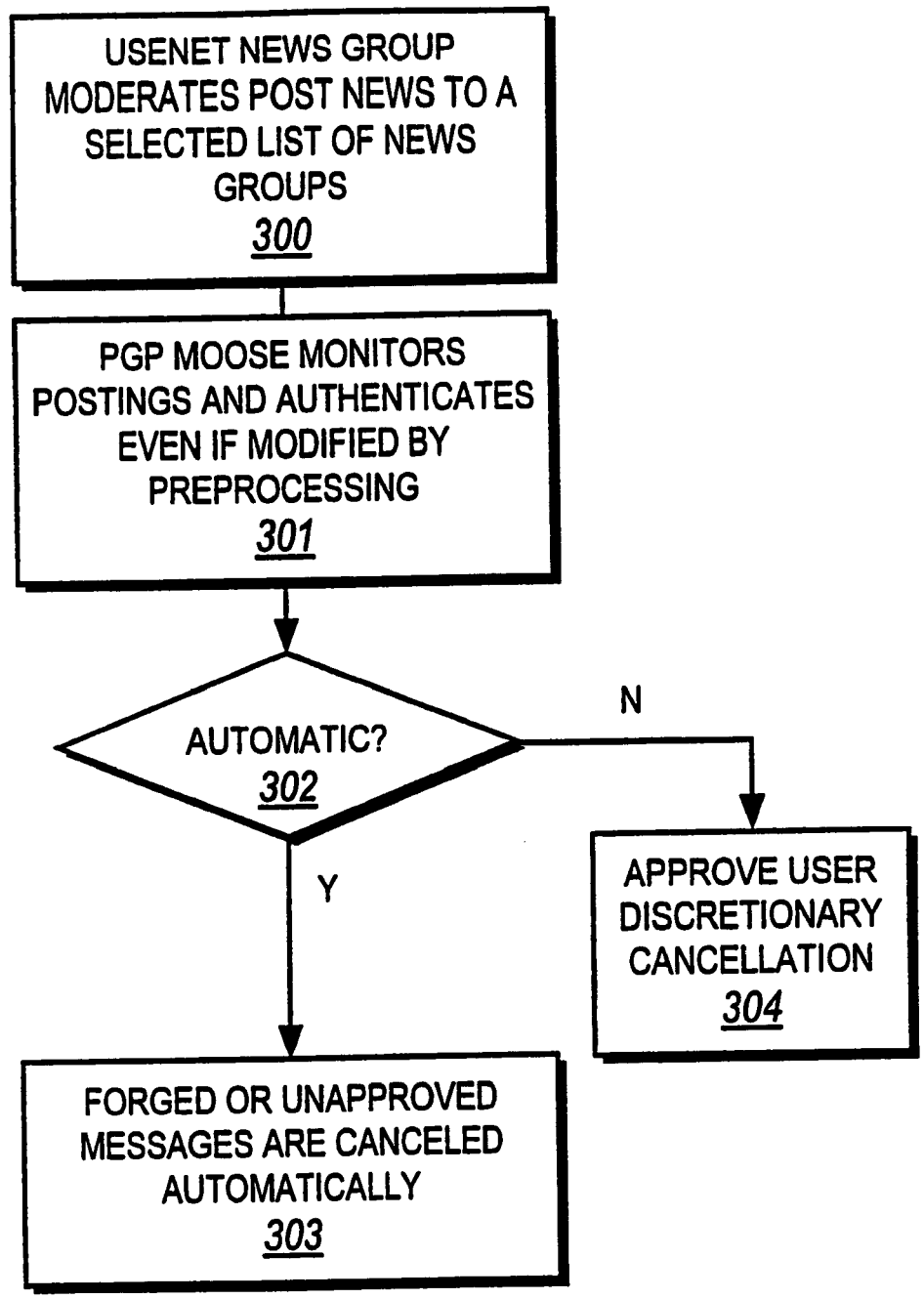
FIG. 3 is a flow chart of a content filtering method according to the prior art.

FIG. 3 is a flow chart of a content filtering method (CFM) 299 according to the prior art. In particular, a Usenet news group (UNG) 300 posts news to a selected list of news groups. UNG 300 uses Pretty Good Privacy (PGP) Moose monitoring 301 of particular postings and authenticating the postings even if the postings are modified by preprocessing. A determination is next made 302 under CFM 299 whether to enable automatic or discretionary cancellation of posted messages. Under a discretionary embodiment according to the prior art, each posting is individually approved by UNG 300. However, in an automatic mode of the prior art, forged or unapproved content (i.e., unsigned) content and messages are cancelled automatically.

Figure 4:
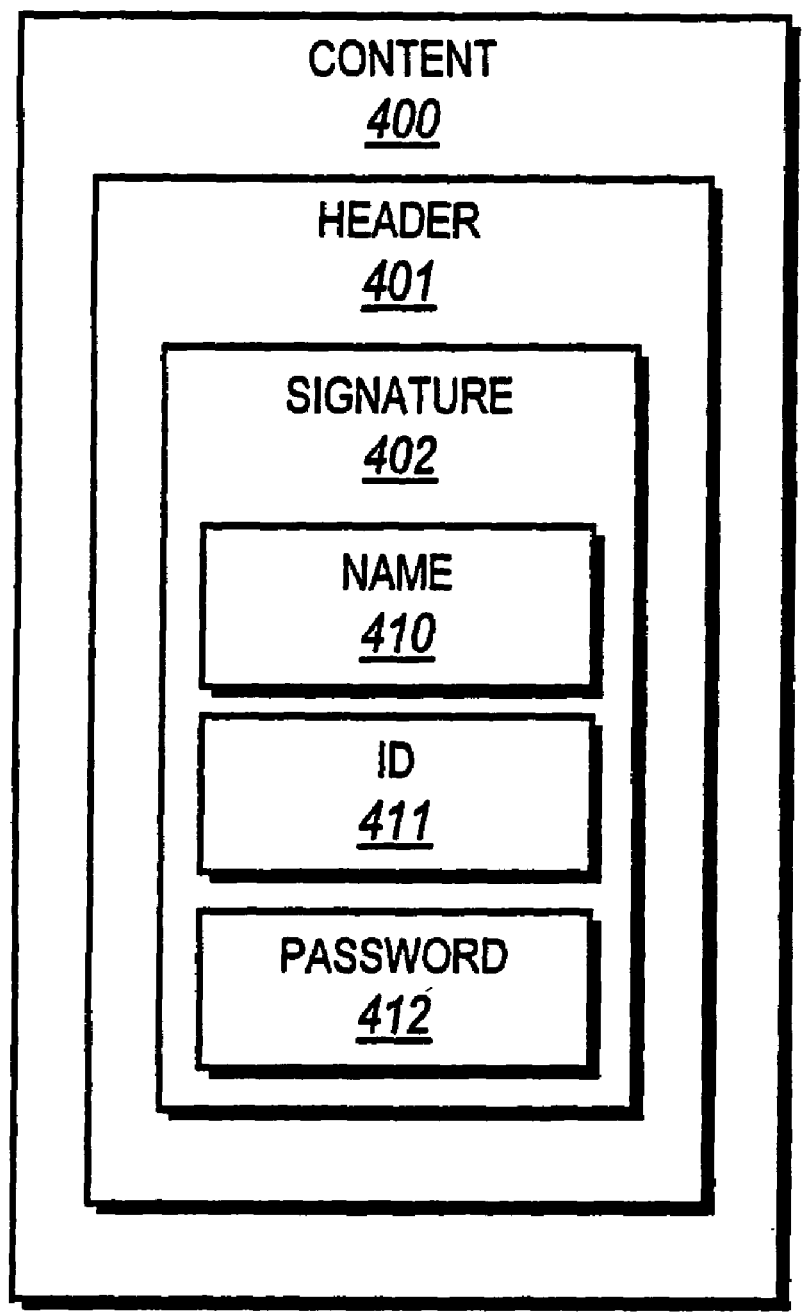
FIG. 4 is a block diagram of a content element according to the prior art.

FIG. 4 is a block diagram of a content element 399 according to the prior art. In particular, an item of content 399 includes, according to the prior art, content material 400, a header 401 in turn including a signature 402. The signature 402 in turn includes a name 410, an identification (ID) code 411, and a password 412, according to one approach.

Figure 5:
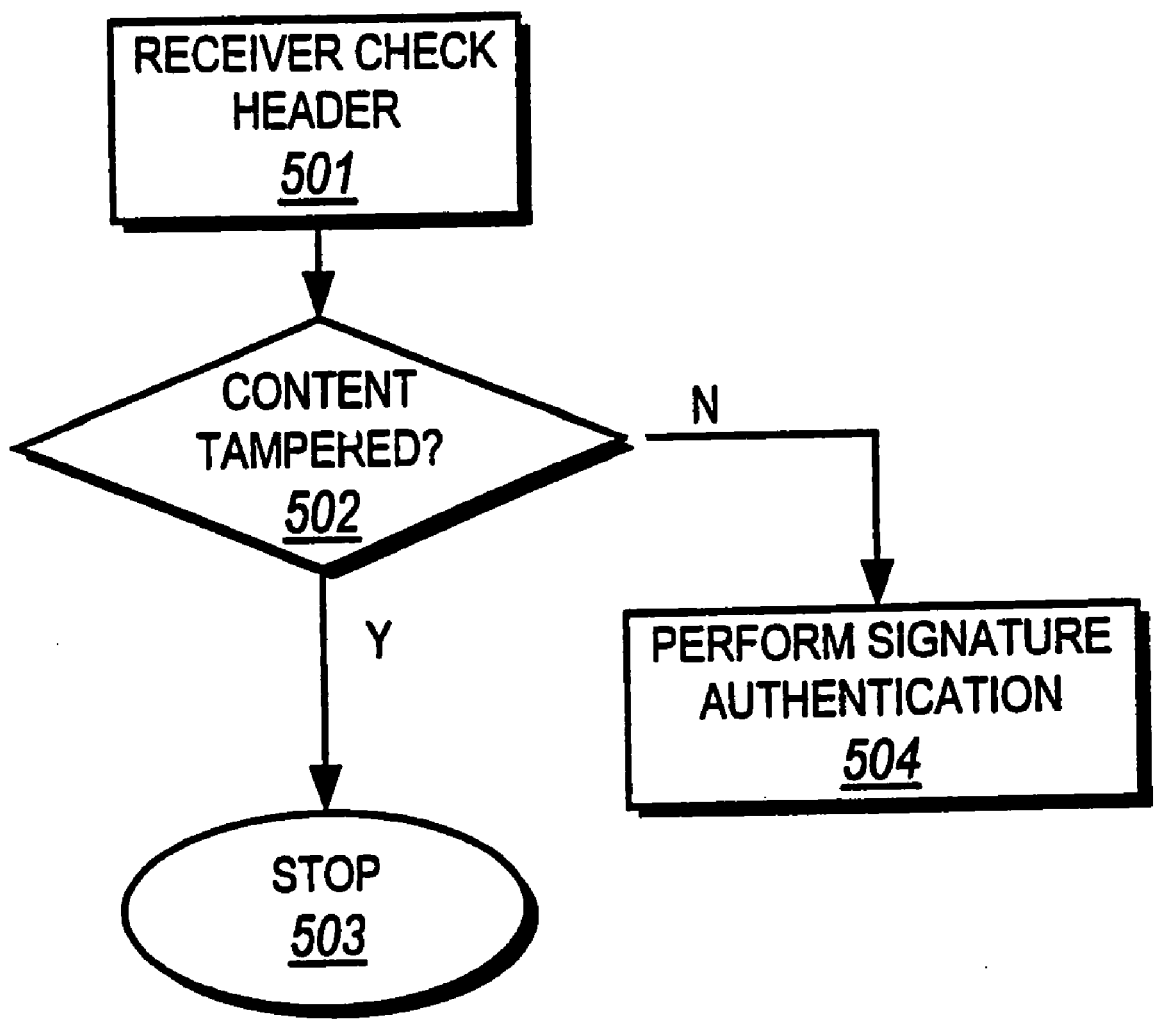
FIG. 5 is a flow chart of a content receiver method according to the prior art.

FIG. 5 is a flow chart of a content receiver method according to the prior art. In particular, according to one embodiment of the present invention, when a content element or item is received after transmission it is checked 501 for a header. Next, a determination is made whether the content received has been subject to tampering 502. If yes, further processing of the content stops 503 as the veracity of the content will have been called into question. In the absence of any identified content tampering, signature authentication is performed 504, to determine the validity of the signature as identifying the source or distributer or the particular content.

What is claimed is:

1. A method for filtering information received from an asserted source, the method comprising:
   receiving selected information including an asserted source of the information and an encryption-created authentication signature of the asserted source;
   determining whether the signature is authentic, the signature being determined to be authentic when the signature can be decrypted to produce information that is coincident with a predetermined authentication reference; and
   when the signature is determined to be authentic, applying the selected information to a preferred information buffer.

2. The method of claim 1, further comprising:
   when said signature is determined to be not authentic, applying said selected information to a non-preferred information buffer.

3. The method of claim 1, further comprising:
   when said signature is determined to be not authentic, declining to process selected information further.

4. The method of claim 1, further comprising providing an authentication signature for content of said selected information.

5. Apparatus for filtering information received from an asserted source, the apparatus comprising a computer that is programmed:
   to receive selected information including an asserted source of the information and an encryption-created authentication signature of the asserted source;
   to determine whether the signature is authentic, the signature being determined to be authentic when the signature can be decrypted to produce information that is coincident with a predetermined authentication reference; and
   when the signature is determined to be authentic, to apply the selected information to a preferred information buffer.

6. The apparatus of claim 5, wherein said computer is further programmed so that, when said signature is determined to be not authentic, said selected information is applied to a non-preferred buffer.

7. The system of claim 5, wherein said computer is further programmed so that:
   when said signature is determined to be not authentic, to decline to process selected information further.

8. The apparatus of claim 5, wherein said selected information includes an authentication signature for content of said selected information, and said computer is further programmed to determine whether the signature for the information content is authentic.

9. A method for filtering information received by e-mail, the method comprising:
   receiving an e-mail message for a specified recipient, including a signature for an asserted source and an asserted access level for the message;
   determining whether the signature for the asserted source and for the asserted access level is authentic;
   when the signature is determined to be authentic, comparing the asserted access level with a required access level for the recipient; and
   taking at least one of the following actions:
      when the asserted access level is at least as great as the required access level, permitting the message to be accessed by the recipient;
      when the asserted access level is less than the required access level, withholding access by the recipient to the message; and
      when the asserted access level and the required access level are not comparable, referring the question of access by the recipient to the message to a selected authority for e-mail access.

10. The method of claim 9, further comprising:
    when said signature is determined to be not authentic, declining to permit access by said recipient to said message.

11. The method of claim 9, further comprising:
    providing said e-mail message with an asserted instrumentality access level and with a signature for the asserted instrumentality access level;
    determining whether the instrumentality access level signature for the asserted source is authentic;
    when the instrumentality access level signature is determined to be authentic, comparing the asserted instrumentality access level with a required instrumentality access level for the recipient for at least one access instrumentality; and
    when the asserted instrumentality access level is at least as great as the required instrumentality access level for the at least one access instrumentality, permitting said message to be accessed by said recipient using the at least one access instrumentality.

12. The method of claim 11, further comprising:
    when said asserted instrumentality access level is not at least as great as said required instrumentality access level for said at least one access instrumentality, declining to permit said message to be accessed by said recipient using said at least one access instrumentality.

13. The method of claim 11, further comprising choosing said at least one access instrumentality from a group of access instrumentalities consisting of: message display only; electronic downloading of said message; provision of a hard copy of said message; automatic display of at least one document associated with said message; and automatic execution of at least one file associated with said message.

14. A system for filtering information received by e-mail, the system comprising a computer that is programmed:
    to receive an e-mail message for a specified recipient, including a signature for an asserted source and an asserted access level for the message;
    to determine whether the signature for the asserted source and for the asserted access level is authentic;
    when the signature is determined to be authentic, to compare the asserted access level with a required access level for the recipient; and
    to take at least one of the following actions:
       when the asserted access level is at least as great as the required access level, to permit the message to be accessed by the recipient;
       when the asserted access level is less than the required access level, to withhold access by the recipient to the message; and
       when the asserted access level and the required access level are not comparable, to refer the question of access by the recipient to the message to a selected authority for e-mail access.

15. The system of claim 14, wherein said computer is further programmed so that:
when said signature is determined to be not authentic, to decline to permit access by said recipient to said message.

16. The system of claim 14, wherein said computer:
to provide said e-mail message with an asserted instrumentality access level and with a signature for the asserted instrumentality access level;
to determine whether the instrumentality access level signature for the asserted source is authentic;
when the instrumentality access level signature is determined to be authentic, to compare the asserted instrumentality access level with a required instrumentality access level for the recipient for at least one access instrumentality; and
when the asserted instrumentality access level is at least as great as the required instrumentality access level for the at least one access instrumentality, to permit said message to be accessed by said recipient using the at least one access instrumentality.

17. The system of claim 16, wherein said computer is further programmed so that:
when said asserted instrumentality access level is not at least as great as said required instrumentality access level for said at least one access instrumentality, to decline to permit said message to be accessed by said recipient using said at least one access instrumentality.

18. The system of claim 16, wherein said computer is further programmed to choose said at least one access instrumentality from a group of access instrumentalities consisting of: message display only; electronic downloading of said message; provision of a hard copy of said message; automatic display of at least one document associated with said message; and automatic execution of at least one file associated with said message.

* * * * *